(12) United States Patent
Yeh et al.

(10) Patent No.: US 7,987,598 B2
(45) Date of Patent: Aug. 2, 2011

(54) DYNAMIC BEARING MANUFACTURING METHOD

(75) Inventors: Dung-Chang Yeh, Taoyuan Hsien (TW); Yung-Ping Lin, Taoyuan Hsien (TW); Yi-Liang Gong, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 1251 days.

(21) Appl. No.: 11/646,555

(22) Filed: Dec. 28, 2006

(65) Prior Publication Data

US 2007/0151104 A1 Jul. 5, 2007

(30) Foreign Application Priority Data

Jan. 3, 2006 (TW) ................................ 95100201 A (51) Int. Cl.
*B21D 53/10* (2006.01)
(52) U.S. Cl. ........... 29/898.02; 29/898.042; 29/898.054; 72/95; 72/100; 72/112; 384/100; 384/115
(58) Field of Classification Search ............... 29/898.02, 29/898.042, 898.054; 72/95, 100, 112; 384/100, 384/115
See application file for complete search history.

(56) References Cited

U.S. PATENT DOCUMENTS

| | | | | |
|---|---|---|---|---|
| 5,265,334 A | * | 11/1993 | Lucier | 29/898.02 |
| 5,325,695 A | * | 7/1994 | Seo et al. | 72/112 |
| 7,563,030 B2 | * | 7/2009 | Hong et al. | 384/100 |

* cited by examiner

*Primary Examiner* — Rick K Chang
(74) *Attorney, Agent, or Firm* — Birch, Stewart, Kolasch & Birch, LLP (57) ABSTRACT

A dynamic bearing manufacturing includes steps of: providing a bearing and a processing tool, the bearing having an axial hole, and the processing tool having at least one protruding pattern formed on an exterior wall of the processing tool; positioning the processing tool into the axial hole of the bearing; pressing the processing tool to contact with an inner wall of the bearing so as to transfer and print the protruding pattern of the processing tool onto the inner wall of the bearing; rotating the processing tool at a first rotation speed and driving the bearing to rotate at a second rotation speed; and forming at least one concave pattern on the inner wall of the bearing, and the at least one concave pattern being corresponding to the protruding pattern of the processing tool.

13 Claims, 8 Drawing Sheets

DYNAMIC BEARING MANUFACTURING METHOD

This Non-provisional application claims priority under 35 U.S.C. §119(a) on Patent Application No. 095100201 filed in Taiwan, Republic of China on Jan. 3, 2006, the entire contents of which are hereby incorporated by reference.

BACKGROUND OF THE INVENTION

1. Field of Invention

The invention relates to a dynamic bearing manufacturing method and in particular to a manufacturing method for dynamic grooves in the dynamic bearing.

2. Related Art

The bearing is one of the important components of a motor. Extending the life and reducing the operating noise of the motor are important considerations in choosing and designing the bearing.

Ball bearings and roller bearings are not suitable in many products due to the noise caused by the rolling balls and rollers and the bearing damage caused by axial or radial forces. Fluid dynamic bearings (FDBs) are invented for these reasons. FDBs have a plurality of herringboned grooves at an inner wall of the bearing to concentrate the stress so that the bearing can be lubricated and the motor can rotate smoothly. Compared to the ball bearing and the roller bearing, the FDB has lower noise and non-abrasion because the rotating shaft do not contact the bearing. Thus, the life of the FDB may be extended.

Figure 1A:
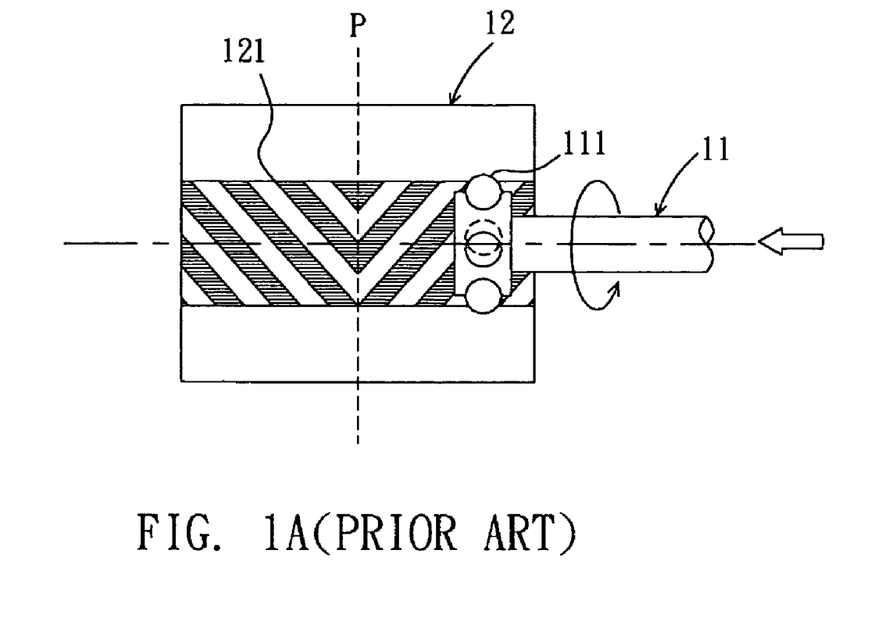
FIGS. 1A and 1B are schematic views showing one conventional processing method of the fluid dynamic bearing.
Figure 1B:
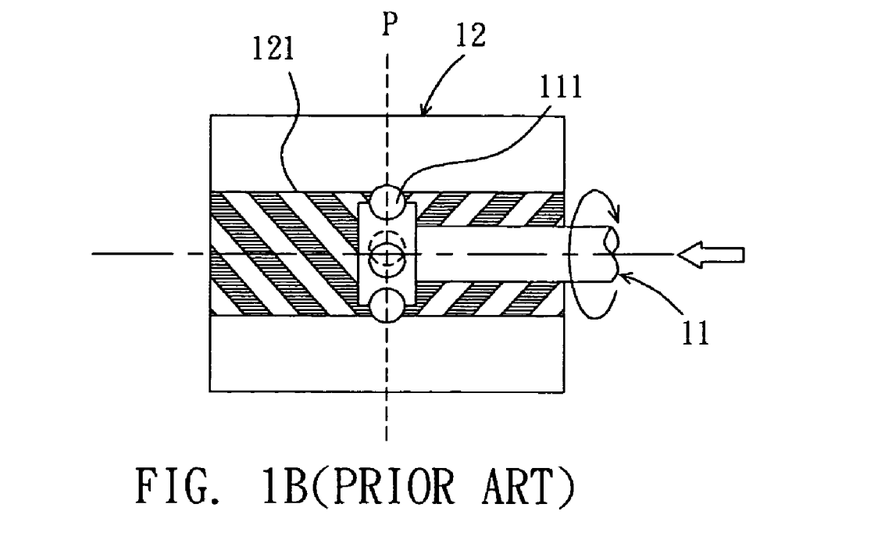

However, the herringboned grooves of the FDB need higher processing precision, which complicates the manufacturing process and increases the manufacturing cost. Referring to FIGS. 1A and 1B, a conventional processing method of the FDB includes the following steps. Firstly, the herringboned grooves are formed by scrapping the inner wall 121 of a bearing 12 with a multi-axle processor 11. The multi-axle processor 11 has four knives rotating and traverses along the inner wall 121 of the bearing 12 in a counterclockwise (or clockwise) direction. Then, when the multi-axle processor 11 reaches a turning point P, the knives of the multi-axle processor 11 rotates and traverses along the inner wall 121 in a clockwise (or counterclockwise) direction so as to form the herringboned grooves on the inner wall 121 of the bearing 12. Because after the herringboned groove is formed, the knives 111 have to return to the original position, it is necessary to constrains the number of the grooves to be even. However, the number of the grooves can not be optimized due to the limitation of the processing, and thus the FDB can not achieve the optimal stress satisfying actual requirements.

Figure 2A:
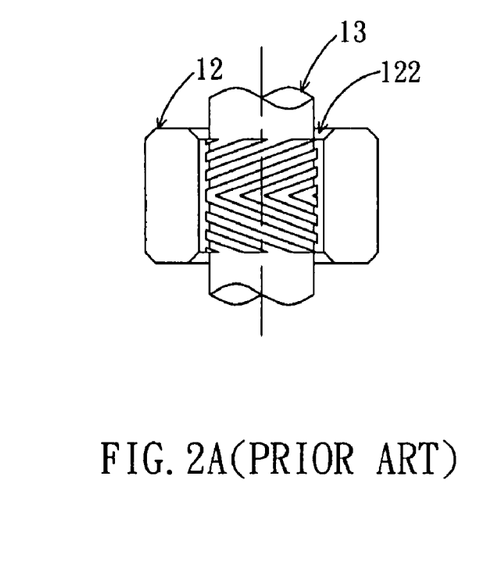
FIGS. 2A to 2C are schematic views showing another conventional processing method of the fluid dynamic bearing.
Figure 2B:
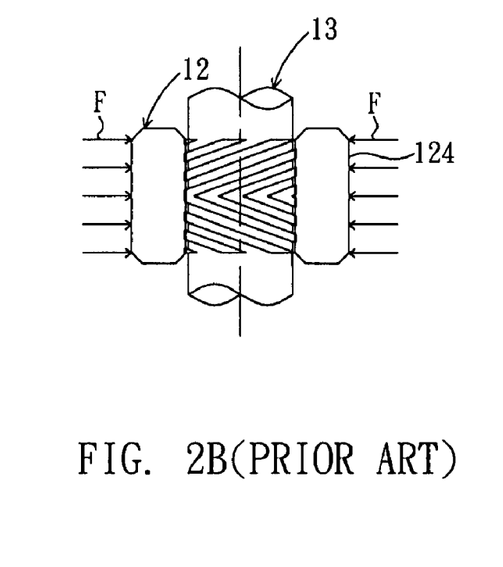
Figure 2C:
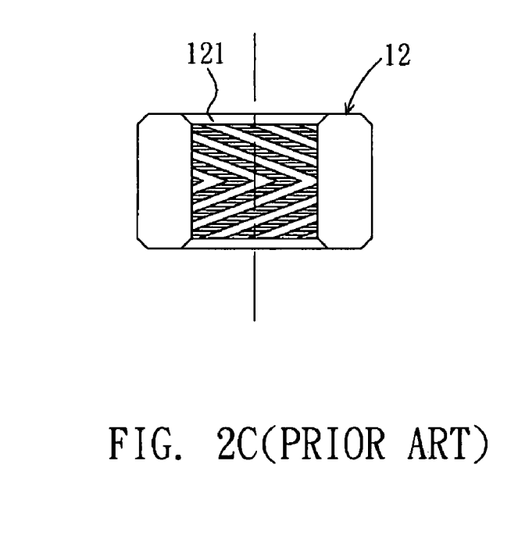

Referring to FIGS. 2A to 2C, another conventional processing method of a FDB is to position a shaft 13 with the herringboned grooves on a central axial hole 122 of the bearing 12 (as shown in FIG. 2A), and then to exert a force F from an exterior wall 124 of the bearing 12 to compress the bearing 12 (as shown in FIG. 2B) so that the inner wall 121 of the bearing 12 conforms to the shaft 13. Therefore, the herringboned grooves are formed on the inner wall 121 of the bearing 12 by a printing method (as shown in FIG. 2C). However, because the grooves are made by pressuring, the wall thickness of the bearing 12 can not be very thick, and the thinner wall thickness may incur shrink of the axial hole.

Figure 3A:
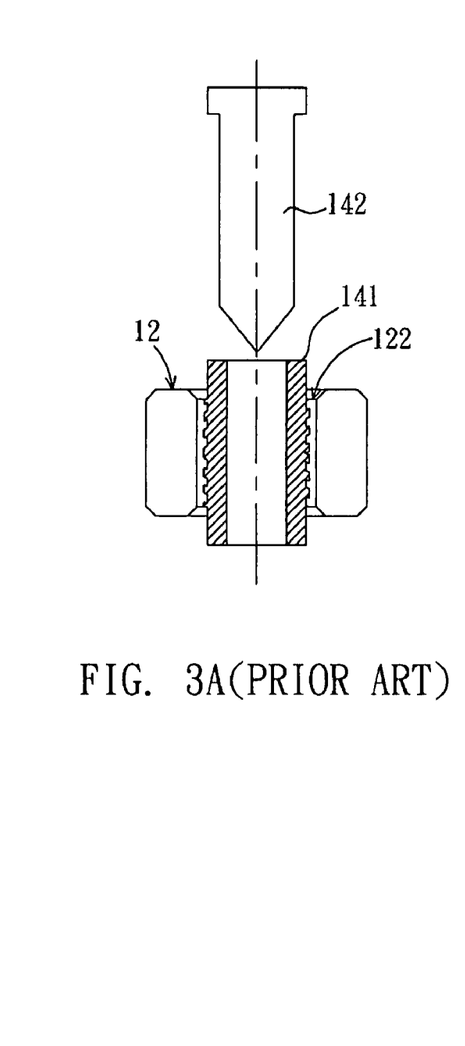
FIGS. 3A to 3C are schematic views showing one another conventional processing method of the fluid dynamic bearing.
Figure 3B:
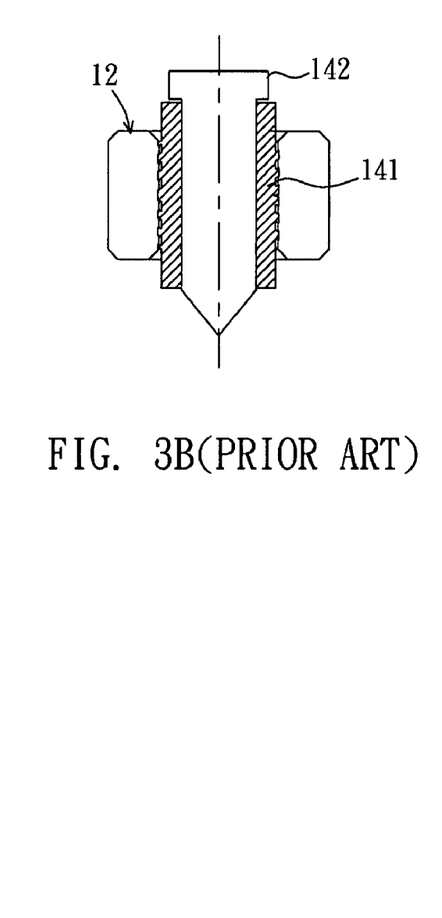
Figure 3C:
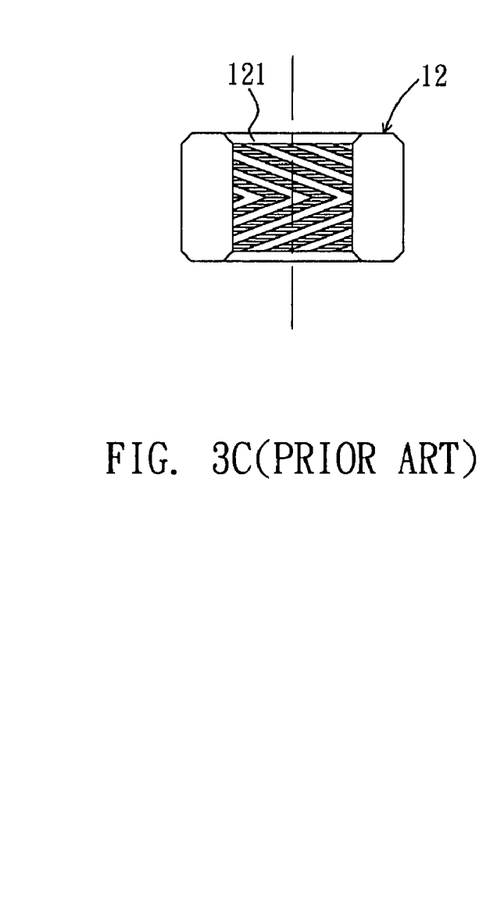

Referring to FIGS. 3A to 3C, another processing method of the FDB is to position a hollow tooling 141 having the herringboned grooves, which are arranged in a protruding pattern, within the central axial hole 122 of the bearing 12 (as shown in FIG. 3A), and then to coercively dilate the hollow tooling 141 by using a dilating element 142 so that the herringboned grooves of the hollow tooling 141 intervene the inner wall 121 of the bearing 12 (as shown in FIG. 3B) and then the herringboned grooves are transferred and printed on the inner wall 121 (as shown in FIG. 3C). However, the coercive introduction of the dilating element 142 to the hollow tooling 141 rapidly wears the hollow tooling 141 and the dilating element 142. If the hollow tooling 141 and the dilating element 142 are worn and not changed promptly, the precision of the herringboned grooves will be imprecise and reduce the reliability of the bearing 12.

As mentioned above, since the conventional processing methods of the FDB have disadvantages such as the limited number of herringboned grooves, the limited thickness of the bearing or the limited processing precision, the design and manufacture. are complicated and the efficiency of the FDB is reduced. Therefore, it is an important subject to provide a manufacturing method of the bearing to solve those problems.

SUMMARY OF THE INVENTION

In view of the foregoing, the invention is to provide a dynamic bearing manufacturing method for making the needed number of the dynamic grooves on the bearing according to actual requirements without being constrained by the wall thickness of the bearing, and assuring the processing precision of the dynamic grooves.

To achieve the above, the invention discloses a dynamic bearing manufacturing method including the steps of: providing a bearing and a processing tool, the bearing having an axial hole, and the processing tool having at least one protruding pattern formed on an exterior wall of the processing tool; positioning the processing tool into the axial hole of the bearing; pressing the processing tool to contact with an inner wall of the bearing so as to transfer and print the protruding pattern of the processing tool onto the inner wall of the bearing; rotating the processing tool at a first rotation speed and driving the bearing to rotate at a second rotation speed; and forming at least one concave pattern on the inner wall of the bearing, and the at least one concave pattern being corresponding to the protruding pattern of the processing tool. In this aspect, the preferred profile of the processing tool is substantially a baton structure.

As mentioned above, the dynamic bearing manufacturing method of the invention forms the grooves on the inner wall of the bearing by using the processing tool with suitably designing of the inner diameter of the bearing and the outer diameter of the processing tool and controlling the rotation speed of the bearing and the processing tool. Thus, the processing tool can achieve required numbers of the dynamic grooves on the inner wall of the bearing rather than only forming even dynamic grooves as conventional methods. There is no limitation to the number of these groves. Compared to the conventional art, the invention reduces coercive stress on the interior and/or the exterior of the bearing and reduces the wear on the processing tool. Additionally, the wall thickness of the bearing can be designed according to actual requirements and the processing precision can be improved.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 4A:
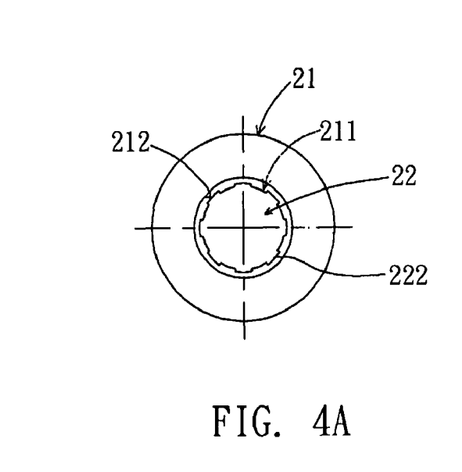
FIGS. 4A to 4C are top views of a dynamic bearing processed by a manufacturing method according to an embodiment of the invention.
Figure 4B:
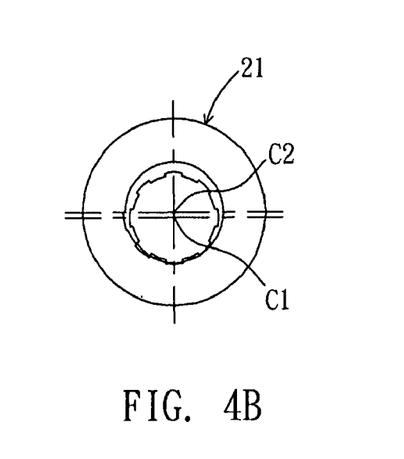
Figure 4C:
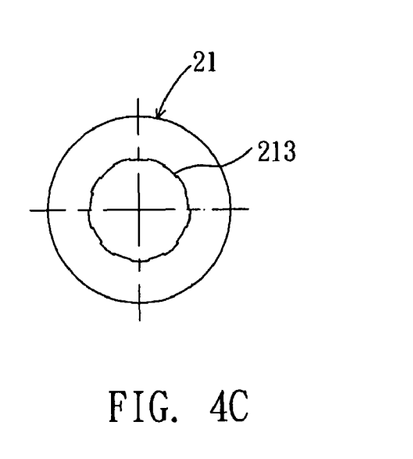
Figures 5A, 5B:
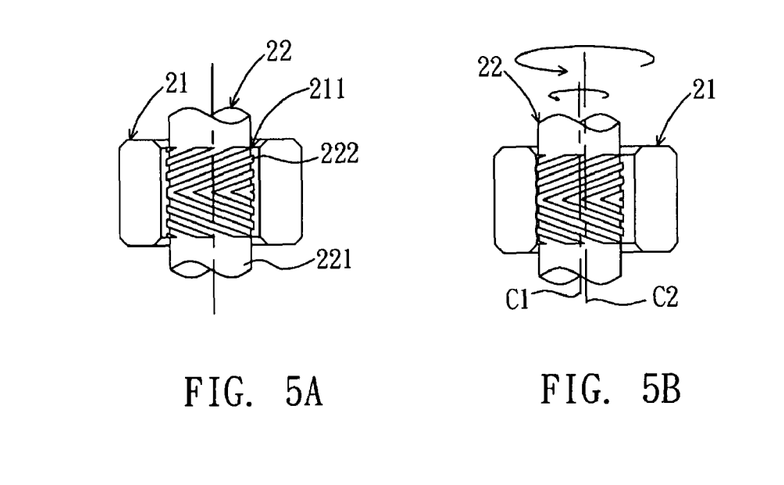
FIGS. 5A to 5C are side views of the dynamic bearing corresponding to FIGS. 4A to 4C.
Figure 5C:
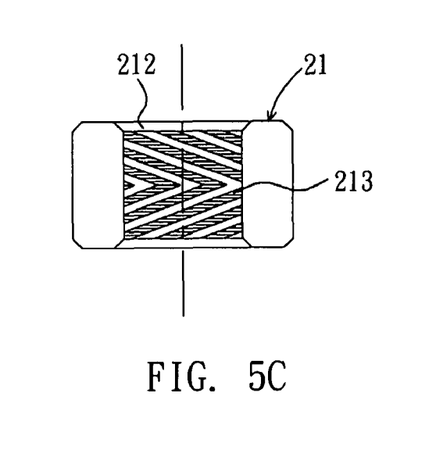

Referring to FIGS. 4A to 5C, which are schematic views showing a dynamic bearing manufacturing method according to an embodiment of the invention. FIGS. 4A to 4C show the top views of the dynamic bearing processed by the manufacturing method, and FIGS. 5A to 5C show lateral views of the dynamic bearing corresponding to FIGS. 4A to 4C. With reference to FIG. 4A and FIG. 5A, the manufacturing method is initiated with a bearing 21 and a processing tool 22, which is substantially a baton structure. The bearing 21 has an axial hole 211 and an inner wall 212. The processing tool 22 has a protruding pattern 222 formed on an exterior wall 221 of the processing tool 22. The protruding pattern 222 is designed according to the desired shape of the dynamic grooves. In the embodiment, the protruding pattern 222 has eight herringboned protruding veins.

Referring to FIGS. 4A to 5C and FIG. 6, the dynamic bearing manufacturing method includes the following steps.

Figure 6:
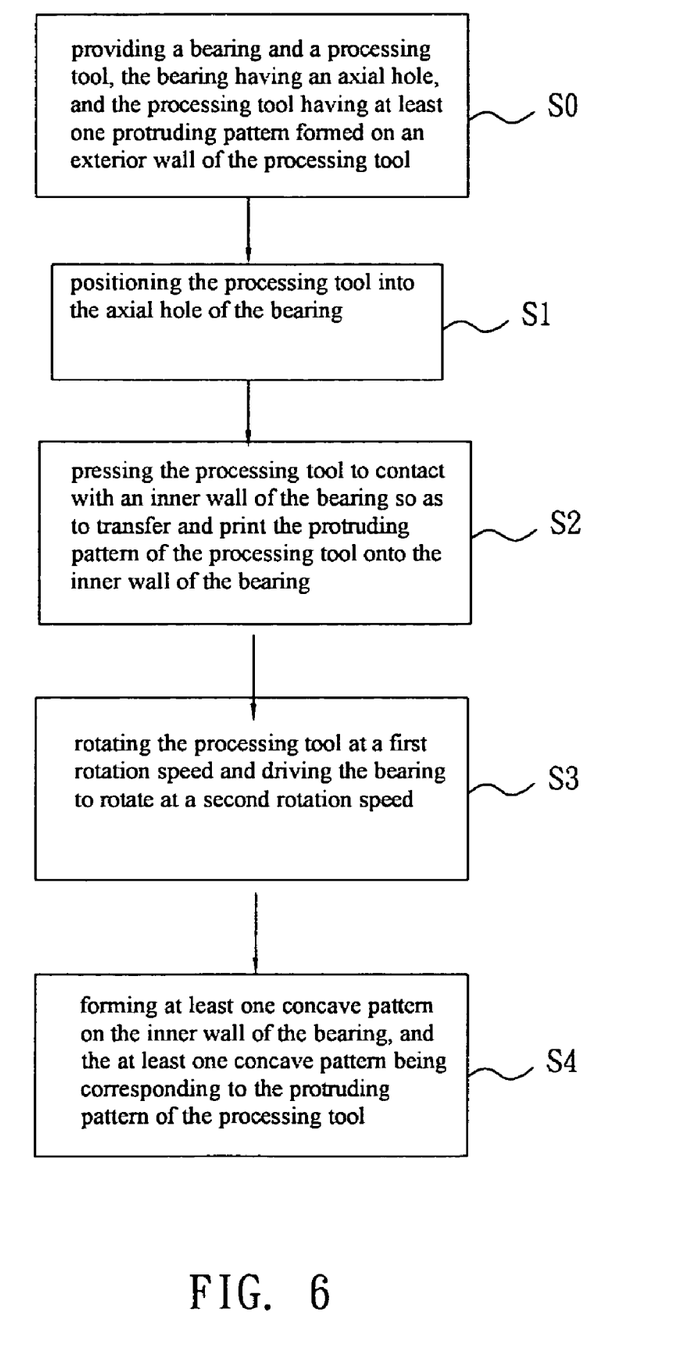
FIG. 6 is a flow chart showing a dynamic bearing manufacturing method according to the preferred embodiment of the invention.

The step S0 discloses that a bearing and a processing tool are provided. The bearing has an axial hole, and the processing tool has at least one protruding pattern formed on an exterior wall of the processing tool. The step S1 discloses that the processing tool 22 is positioned into the axial hole 211 of the bearing 21 and preferably positioned along a central axis of the axial hole 211. In this embodiment, the processing tool 22 can be easily positioned into the axial hole 211 of the bearing 21 because the inner diameter of the bearing 21 is greater than the outer diameter of the processing tool 22.

The step S2 discloses that the inner wall 212 of the bearing 21 and the processing tool 22 are pressed together, and thus the protruding pattern 222 of the exterior wall 221 of the processing tool 22 are transferred and printed onto the inner wall 212 of the bearing 21.

The step S3 discloses that the processing tool 22 rotates at a first rotation speed and drives the bearing 21 to rotate at a second rotation speed. In this embodiment, the first rotation speed is greater than the second rotation speed, and the rotation directions of the bearing 21 and the processing tool 22 are the same. Additionally, in this embodiment, the ratio of the first rotation speed to the second rotation speed is 9 to 8, the processing tool 22 rotates with respect to a first axis C1 and the bearing 21 rotates with respect to a second axis C2 so as to perform the rotating and pressing the protruding pattern 222 of the exterior wall 221 of the processing tool 22 to be transferred and printed onto the inner wall 212 of the bearing 21.

The step S4 discloses that the concave pattern 213 is formed corresponding to the protruding pattern 222 on the inner wall 212 of the bearing 21. The concave pattern 213 has a plurality of herringboned grooves, the protruding pattern 222 has a plurality of herringboned protrusions, and the number of the herringboned grooves is greater than the number of the herringboned protrusions. In this embodiment, the processing tool 22 has the protruding pattern 222 with eight herringboned stripes formed on the exterior wall 221, and the rotation ratio of the processing tool 22 to the bearing 21 is accurately controlled as 9 to 8 so as to form the concave pattern 213 with nine herringboned grooves on the inner wall 212 of the bearing 21. In other words, the concave pattern 213 with odd herringboned grooves can be formed on the inner wall 212 of the bearing 21 by the protruding pattern 222 with even herringboned protrusions on the exterior wall 221 of the processing tool 22. Because the concave pattern 213 is formed corresponding to the protruding pattern 222, the concave pattern 213 is herringboned.

Figure 7A:
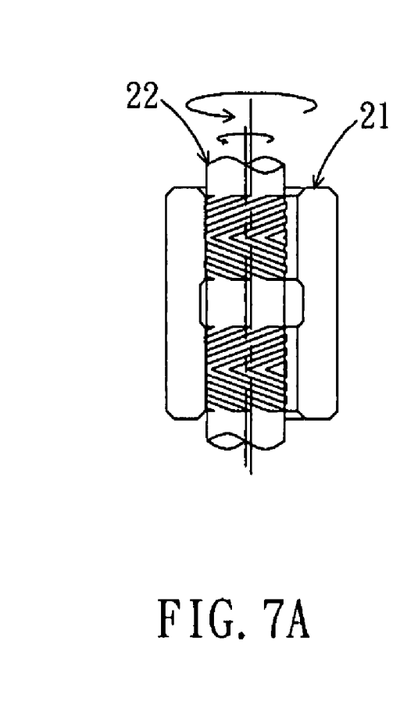
FIGS. 7A and 7B are schematic views showing that one journal bearing is manufactured by the dynamic bearing manufacturing method according to the preferred embodiment of the invention.
Figure 7B:
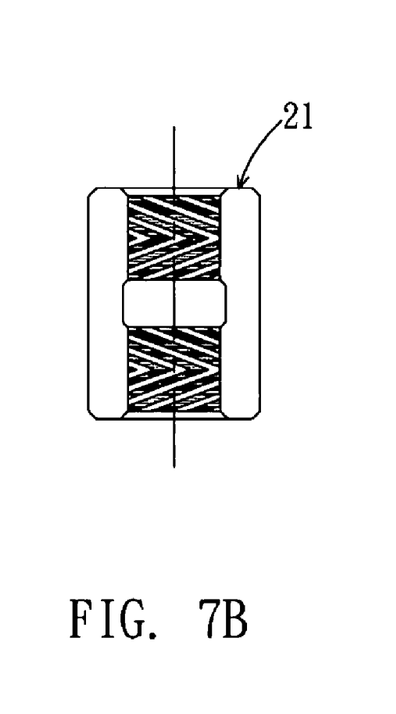
Figure 8A:
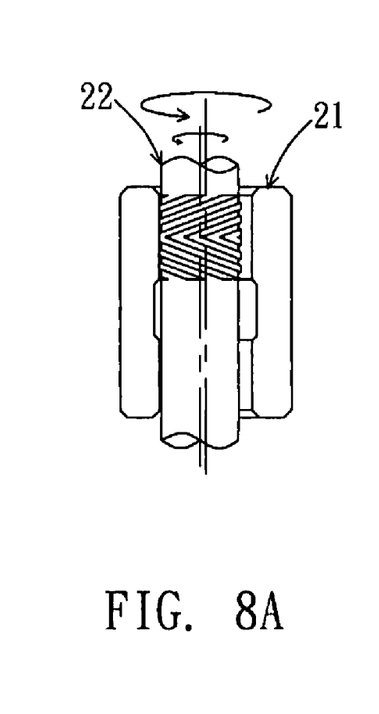
FIGS. 8A and 8B are schematic views showing that another journal bearing is manufactured by the dynamic bearing manufacturing method according to the preferred embodiment of the invention.
Figure 8B:
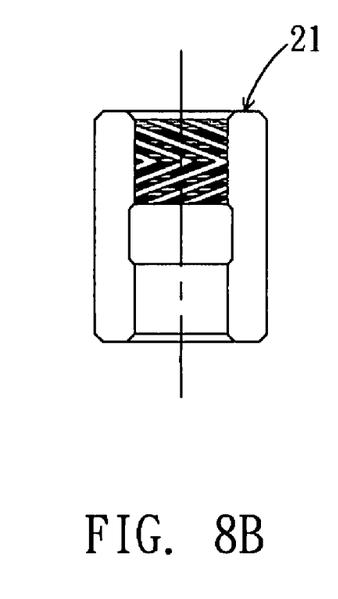
Figure 9A:
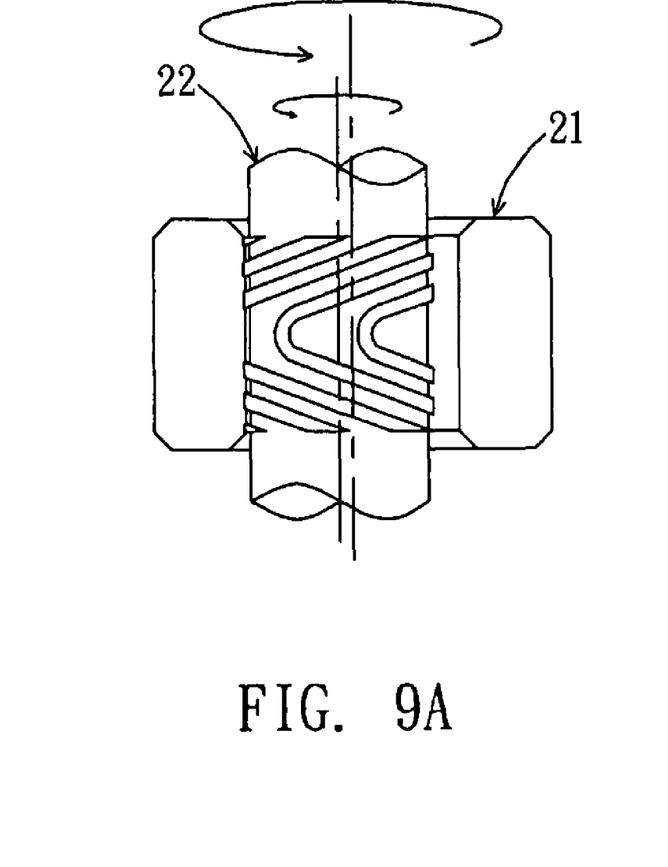
FIGS. 9A And 9B are schematic views showing that the circular angle herringboned grooves are formed by the manufacturing method according to the preferred embodiment of the invention.
Figure 9B:
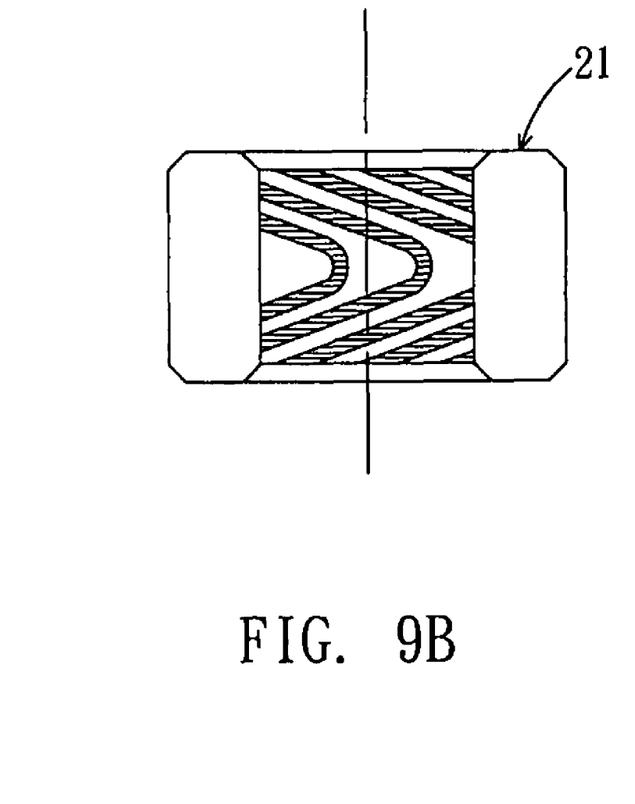
Figure 10A:
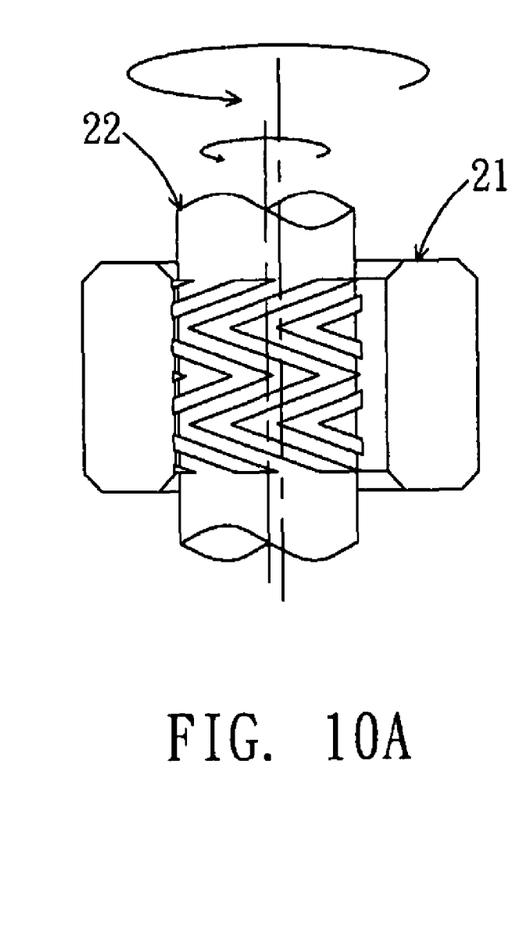
FIGS. 10A and 10B are schematic views showing that the inverted-W grooves are formed by the manufacturing method according to the preferred embodiment of the invention.
Figure 10B:
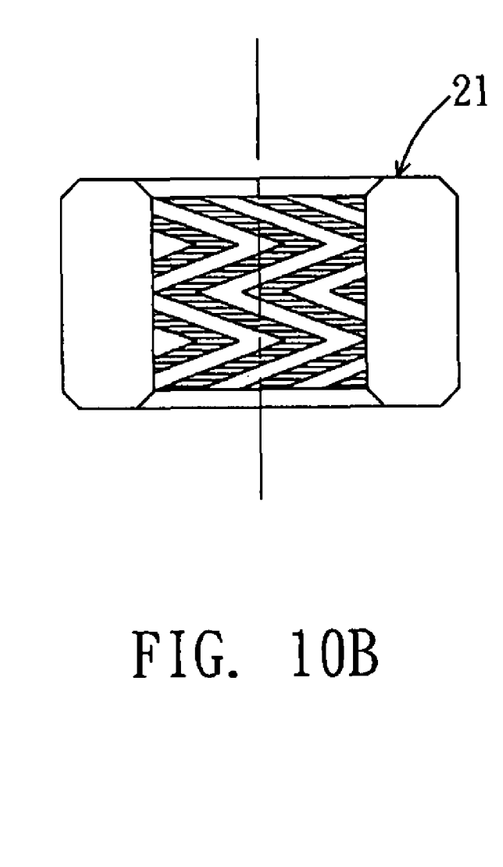

FIGS. 7A to 8B are schematics of another two embodiments of the dynamic bearing manufacturing method, which are applied in manufacturing the journal bearing. The herringboned grooves can be formed on the inner wall 212 of the bearing 21 by using two sets (as shown in FIGS. 7A and 7B) or using a single set (as shown in FIGS. 8A and 8B) of protruding patterns formed on the exterior wall 221 of the processing tool 22. The protruding pattern can be designed according to the required groove profiles. For example, referring to FIGS. 9A and 9B, if the protrusion pattern of the processing tool 22 is rounded herringbone veins, the profile of the grooves of the bearing 21 is also rounded herringbone veins. Referring to FIGS. 10A and 10B, if the protruding pattern of the processing tool 22 is inverted-W herringbone lines, the profile of the grooves of the bearing 21 is also inverted-W herringbone veins.

In summary, the dynamic bearing manufacturing method of the invention forms the grooves on the inner wall of the bearing by using the processing tool with suitably designing of the inner diameter of the bearing and the outer diameter of the processing tool and controlling the rotation speed of the bearing and the processing tool. Thus, the processing tool can achieve required numbers of the dynamic grooves on the inner wall of the bearing rather than only forming even dynamic grooves as conventional methods. There is no limitation to the number of these groves. compared to the conventional art, the invention reduces coercive stress on the interior odd/or the exterior of the bearing and reduces the wear on the processing tool. Additionally, the wall thickness of the bearing can be designed according to actual requirements and the processing precision can be improved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A dynamic bearing manufacturing method, comprising steps of:
   providing a bearing and a processing tool, the bearing having an axial hole, and the processing tool having at least one protruding pattern formed on an exterior wall of the processing tool;
   positioning the processing tool into the axial hole of the bearing;
   pressing the processing tool to contact with an inner wall of the bearing so as to transfer and print the protruding pattern of the processing tool onto the inner wall of the bearing;
   rotating the processing tool at a first rotation speed and driving the bearing to rotate at a second rotation speed; and
   forming at least one concave pattern on the inner wall of the bearing, and the at least one concave pattern being corresponding to the protruding pattern of the processing tool.

2. The method according to claim 1, wherein the processing tool is substantially a baton structure.

3. The method according to claim 2, wherein an axial hole aperture of the bearing is greater than an outer diameter of the processing tool.

4. The method according to claim 1, wherein the processing tool is positioned along a central axis of the axial hole.

5. The method according to claim 1, wherein the first rotation speed is greater than the second rotation speed.

6. The method according to claim 1, wherein the bearing and the processing tool have the same rotation directions.

7. The method according to claim 1, wherein the protruding pattern formed on the exterior wall of the processing tool has a herringbone, rounded herringbone or inverted-W herringbone shape.

8. The method according to claim 7, wherein the concave pattern formed on the inner wall of the bearing has a herringboned, rounded herringboned or inverted-W herringboned shape.

9. The method according to claim 1, wherein the processing tool rotates with respect to a first axis and the bearing rotates with respect to a second axis.

10. The method according to claim 1, wherein the concave pattern has a plurality of herringboned grooves, the protruding pattern has a plurality of herringboned protrusions, and the number of the herringboned grooves is greater than the number of the herringboned protrusions.

11. The method according to claim 10, wherein the concave pattern with odd herringboned grooves is formed on the inner wall of the bearing by the protruding pattern with even herringboned protrusions on the exterior wall of the processing tool.

12. The method according to claim 1, wherein the bearing is a journal bearing.

13. The method according to claim 1, wherein the step of rotating the processing tool at a first rotation speed and driving the bearing to rotate at a second rotation speed is without advancing the processing tool.

* * * * *